United States Patent
Lachambre et al.

(10) Patent No.: US 9,262,151 B2
(45) Date of Patent: Feb. 16, 2016

(54) METHODS AND SYSTEMS FOR AUTOMATIC CONFIGURATION OF ALGORITHMS IN A SYSTEM BASED ON SELF AWARE ALGORITHMS

(71) Applicant: Citrix Systems, Inc., Fort Lauderdale, FL (US)

(72) Inventors: Sheldon Ferdinand Lachambre, London (GB); David Greggory Thornley, Schaumburg, IL (US)

(73) Assignee: Citirx Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/521,869

(22) Filed: Oct. 23, 2014

(65) Prior Publication Data
US 2015/0113515 A1    Apr. 23, 2015

Related U.S. Application Data (60) Provisional application No. 61/894,786, filed on Oct. 23, 2013.

(51) Int. Cl.
*G06F 9/445* (2006.01)
*G06F 9/44* (2006.01)

(52) U.S. Cl.
CPC .. *G06F 8/65* (2013.01); *G06F 8/60* (2013.01); *G06F 8/70* (2013.01); *G06F 8/68* (2013.01)

(58) Field of Classification Search
None
See application file for complete search history.

(56) References Cited

U.S. PATENT DOCUMENTS

| | | | |
|---|---|---|---|
| 8,065,730 B1 * | 11/2011 | Sobel | G06F 21/56 713/188 |
| 8,438,555 B1 * | 5/2013 | Bodine et al. | 717/167 |
| 2003/0028563 A1 * | 2/2003 | Stutz | G06F 17/2247 715/236 |
| 2008/0127171 A1 * | 5/2008 | Tarassov | G06F 8/60 717/174 |
| 2008/0222621 A1 * | 9/2008 | Knight et al. | 717/151 |
| 2010/0313223 A1 * | 12/2010 | Straub | 725/60 |
| 2011/0321014 A1 * | 12/2011 | Nagoria et al. | 717/125 |
| 2013/0031546 A1 | 1/2013 | Agarwal et al. | |
| 2013/0167135 A1 * | 6/2013 | Neumann | G06F 9/44552 717/174 |
| 2014/0245290 A1 * | 8/2014 | Gupta | G06F 8/61 717/178 |
| 2014/0331297 A1 * | 11/2014 | Innes et al. | 726/7 |

OTHER PUBLICATIONS

International Search Report and Written Opinion for International Application No. PCT/US2014/062042 dated Jan. 28, 2015; 12 pages.

(Continued)

*Primary Examiner* — Don Wong
*Assistant Examiner* — Shirin Alizadeh
(74) *Attorney, Agent, or Firm* — Finnegan, Henderson, Farabow, Garrett & Dunner LLP (57) ABSTRACT

A system and method is provided for configuring compatibility algorithms for testing compatibility of applications with a platform. The method is performed by one or more processors and comprises attaching compatibility algorithms associated with compatibility applications with meta data or executable code. The method also comprises receiving a request for determining which compatibility algorithms are compatible with a platform, wherein the request includes one or more attributes of the platform. The method further comprises comparing the one or more attributes of the platform with the attached meta data or attached executable code, and identifying at least one compatibility algorithm based on the comparison such that the identified compatibility algorithm determines whether to run the identified compatibility algorithm.

24 Claims, 8 Drawing Sheets

(56) References Cited

OTHER PUBLICATIONS

Citrix Systems Inc.; "AppDNA 6.1 Advanced Feature Guide"; 2012; 84 pages.

Citrix Systems Inc.; "AppDNA 6.1 Basic User Guide"; 2012; 86 pages.
U.S. Appl. No. 14/094,697, filed Dec. 2, 2013.

* cited by examiner

METHODS AND SYSTEMS FOR AUTOMATIC CONFIGURATION OF ALGORITHMS IN A SYSTEM BASED ON SELF AWARE ALGORITHMS

CROSS-REFERENCE TO RELATED APPLICATIONS

This application claims the benefit of U.S. Provisional Application No. 61/894,786, filed Oct. 23, 2013, which is herein incorporated by reference in its entirety.

FIELD

The present disclosure generally relates to application assessment (for example, application compatibility) to different platforms. Exemplary embodiments relate to methods and systems for automatically configuring algorithms that determine compatibility of the application with one or more computer platforms.

BACKGROUND

Today's rapidly changing technology requires application users to migrate from one platform to another, such as Windows 7™ to Windows 8™, or changes to runtime environment, such as App-V™, every couple of years. For every instance of such migration, users have to validate each application to ensure compatibility of the application with the migrated platform. This process might need to be repeated for every major and/or minor new release of a given platform. As organizations and users demand new and improved features, the frequency of updating platforms increases, thereby also increasing the importance of the migration from one platform or version to another.

Such migration is critical for enterprise users running thousands of applications for any given project on any given platform. And each such application can be associated with many different algorithms that detect compatibility of the application with various platforms and platform versions. That is, verification of applications and their associated algorithms for any given platform can be very complex and time consuming. Traditionally, such migration and verification is implemented manually, costing the organization a significant number of man hours (or months or years) and cost.

While a number of current techniques can be used to perform an accurate analysis to detect compatibility of an application across different platforms, the current techniques often involve significant manual configuration to identify the platforms that require compatibility testing, and which algorithms to run for each application. Such a process can be time consuming and can also require ongoing maintenance. Furthermore, manual configuration usually requires an administrator or technician with significant specialized knowledge.

Manual configuration is also prone to errors, leading to false reports. For example, a compatibility report for an application may include false positive results showing that an application is not compatible with a platform because the wrong algorithm was selected during manual configuration, whereas in reality the application is indeed compatible when analyzed using the correct algorithm. A reduction in the percentage of false positives is desired when migrating between platforms, to increase system efficiency and improve the performance of computer systems and networks.

BRIEF DESCRIPTION OF THE DRAWINGS

Reference will now be made to the accompanying drawings showing example embodiments of this disclosure. In the drawings.

DETAILED DESCRIPTION OF DRAWINGS

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts. In this disclosure, the phrase "platform" may be any computer software platform such as, for example, a Windows™-based platform (e.g., Windows 8™), an Apple™-based platform (Mac OS X™), or a mobile-based platform such as Apple iOS™. It will be understood, in some embodiments, that "platform" can also mean a hardware platform.

The present disclosure generally relates to application compatibility with different platforms. As used herein, "compatibility" may be considered similar to "suitability" of applications to different platforms. Exemplary embodiments relate to methods and systems for an automatic configuration for determining application compatibility from one platform to another.

Figure 1:
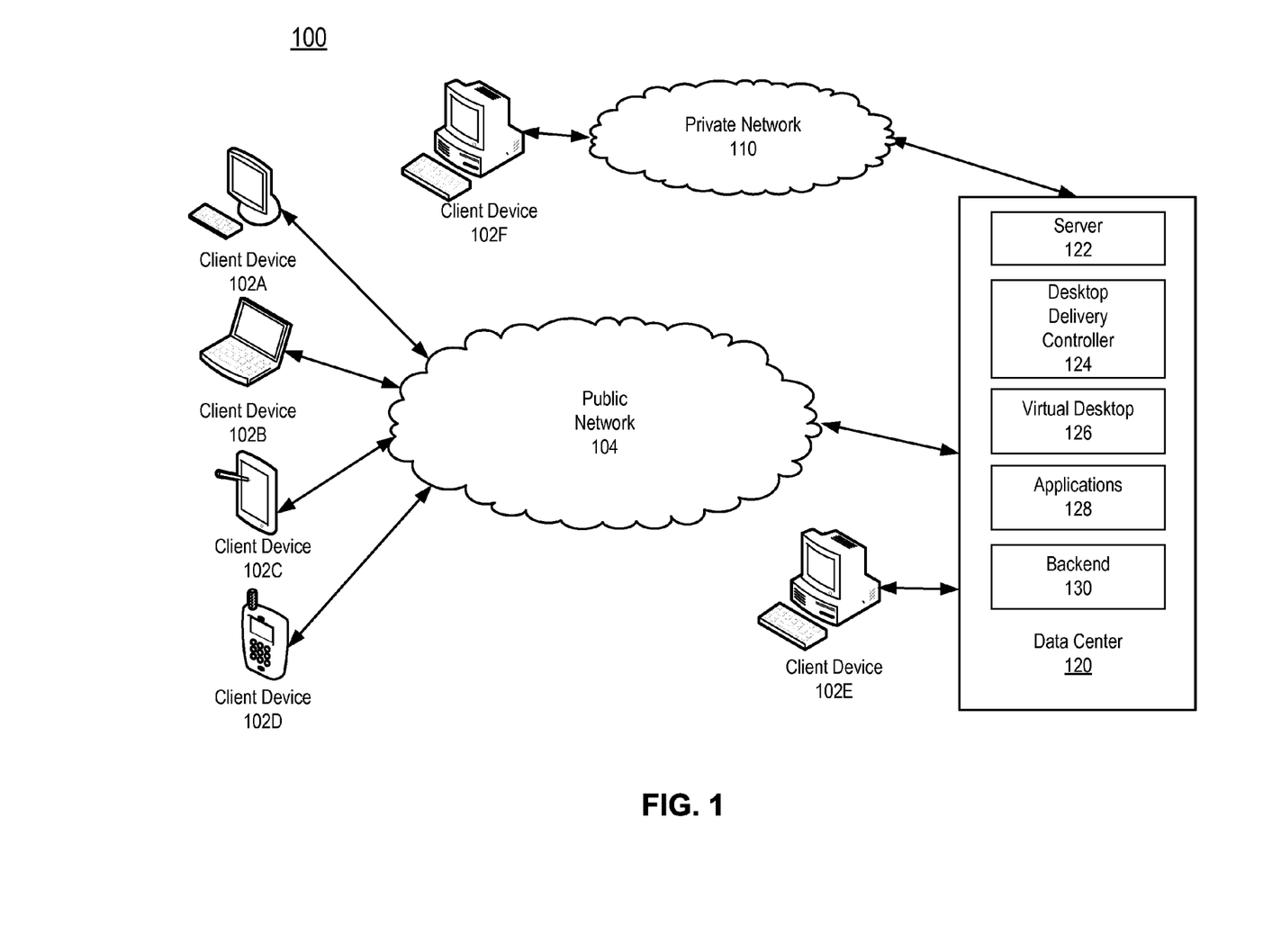
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, and a data center 120.

One or more client devices 102A-F are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing a client device (e.g. client device 102F) access to data center 120. While client devices 102A-F are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device that communicates packets to and from data center 120. For example, client devices 102A-F can be referred to as a computing device, an electronic device, a mobile device, a communications device, and the like.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 can provide one or more services to an endpoint. These services can include providing one or more desktops operating on one or more platforms and one or more applications 128 to one or more endpoints (e.g., client devices 102A-F). For example, the one or more applications 128 can include Windows™- or SAP™-based applications and computing resources. In some embodiments, server 122 can provide application compatibility services. For example, application compatibility between one platform to another (e.g., Window 7™ to Windows 8™) can be performed at server 122. Moreover, the compatibility services can include application migration services.

Desktop delivery controller 124 can be a device that enables delivery of services, such as virtual desktop 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128. In some embodiments, controlling, managing, maintaining, or optimizing the provisioning of applications 128 can be implemented for one or more platforms. That is, desktop delivery controller 124 can enable delivery of application migration and compatibility services for one or more platforms.

In some embodiments, one or more virtual desktops 126 can provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof. In some embodiments, applications 128 can be associated with one or more platforms. That is, one or more virtual desktops 126 can provide one or more applications 128, which can be verified as being compatible with and migrated across one or more platforms.

Backend system 130 may include one or more instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. In some embodiments, backend system 130 may include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140 (not shown).

Figure 2A:
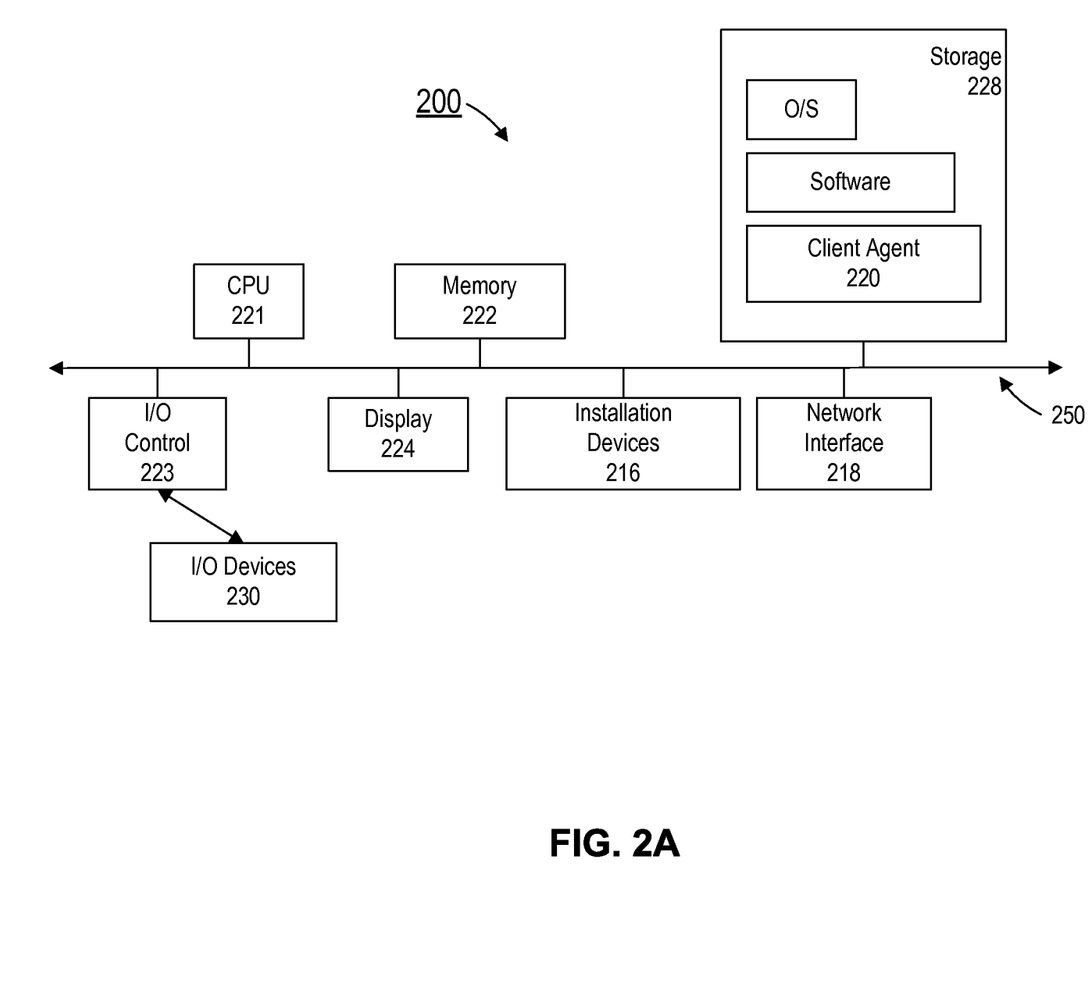
FIGS. 2A-2B are block diagrams of examples of a computing device, consistent with embodiments of the present disclosure.
Figure 2B:
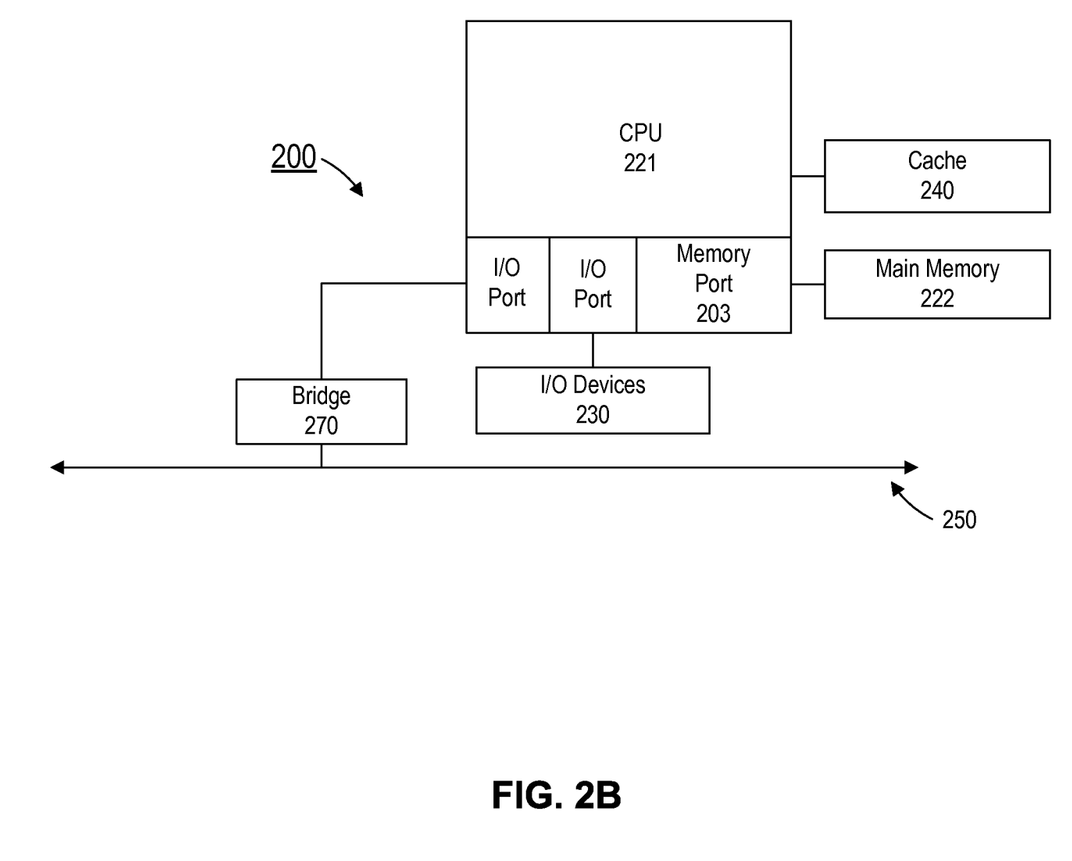

As shown in FIGS. 2A-2B, each computing device 200 (such as server 122 or a client device interfacing with server 122) includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A depicts an embodiment of computing device 200 in which CPU 221 communicates with main memory 222 via a system bus 250. As shown in FIG. 2A, in some embodiments computing device 200 may include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts a second instance of an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

Referring again to FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 may further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
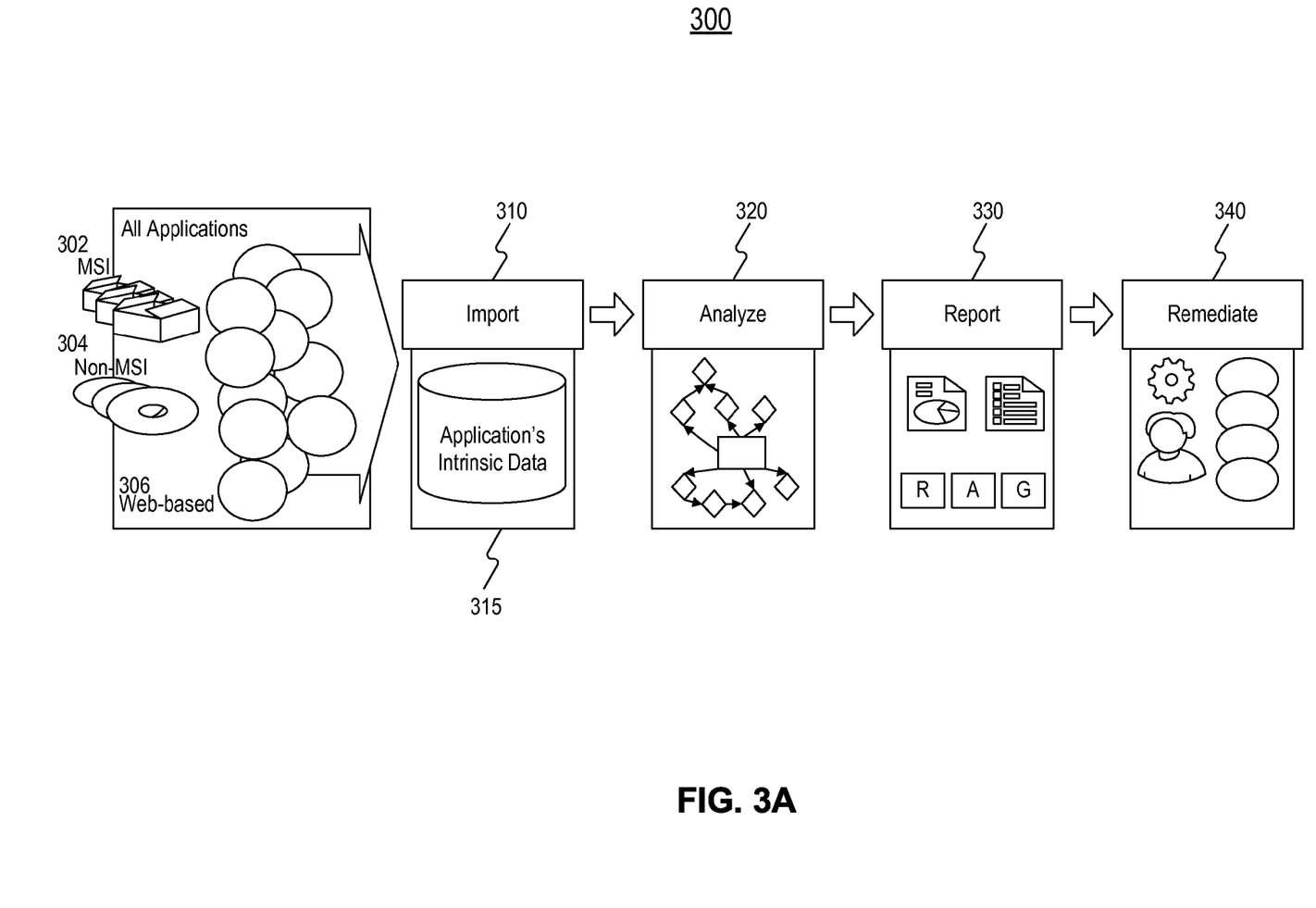
FIG. 3A is a block diagram of an exemplary process for implementing an application compatibility system, consistent with embodiments of the present disclosure.

FIG. 3A depicts a block diagram of an exemplary process 300 implementing an application compatibility system. Process 300 can comprise steps including importing applications 310, analyzing the imported applications 320, generating one or more reports 330, and remediating 340. Process 300 may be performed by a processor such as CPU 221 of computing device 200. In some embodiments, one or more steps of process 300 may be performed by a processor other than CPU 221, in a distributed computing system. In some embodiments, one or more applications may be imported as raw material (i.e. input) for the application compatibility system. When applications are imported, the application compatibility system may interrogate each application's files, registry entries, and application programming interface ("API") usage to expose the application's intrinsic data that can uniquely identify the application and determine compatibility with one or more computer platforms.

In some embodiments, each application may have a distinct intrinsic data that can uniquely identify the application including a plurality of data points, reflecting the application's files, registry entries, and application programming interface ("API") usage In some embodiments, the data points of the application's intrinsic data that can uniquely identify the application can be based on heuristics, and, each application can include over 68,000 data points. An example of these data points is illustrated in FIG. 3B.

Figure 3B:
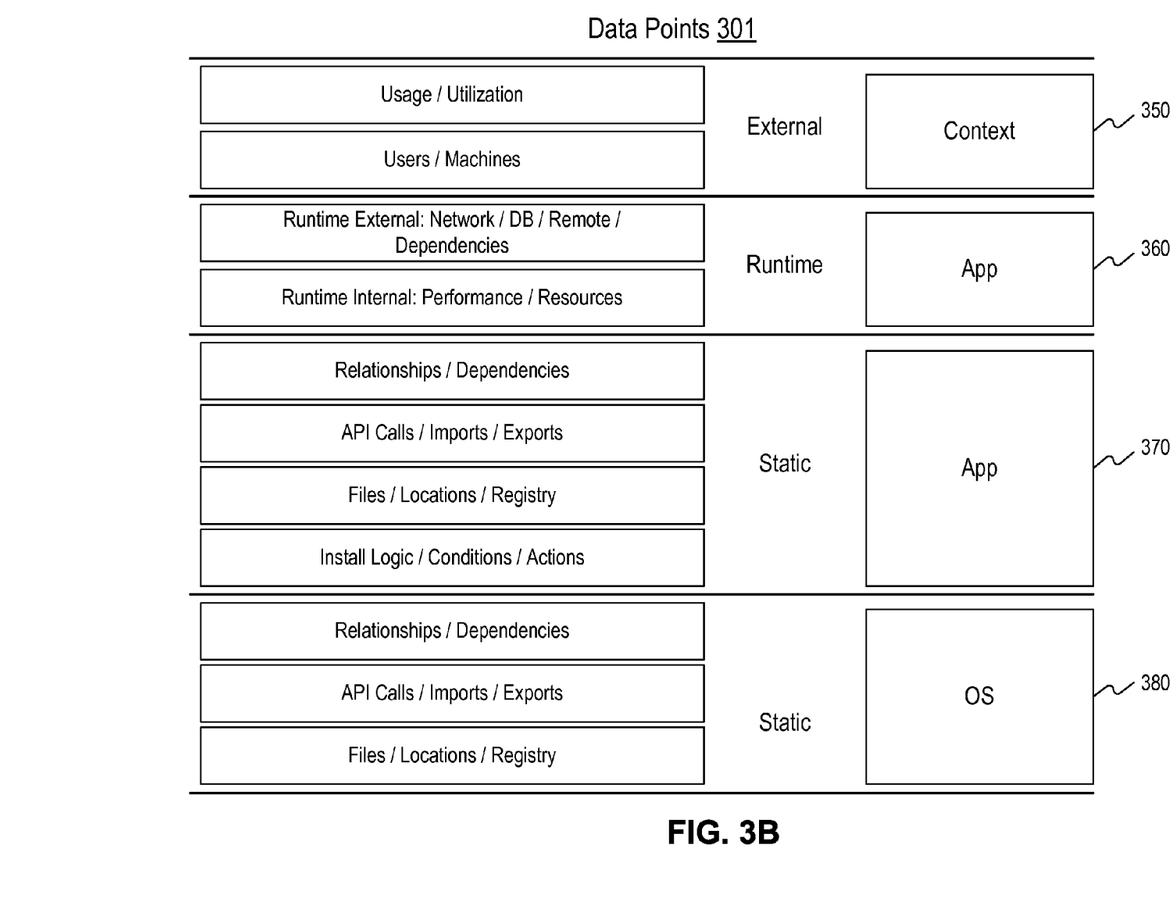
FIG. 3B is a block diagram illustrating exemplary application heuristic data points, consistent with embodiments of the present disclosure.

As shown in FIG. 3B, data points 301 may include information associated with an application's external context data 350, runtime application data 360, static application data 370, and static operating system (OS) data 380. Application's static data 370 can include information associated with install logic, install conditions, and/or install actions. Such data can also include information associated with application's files, registry settings, and/or configuration settings. It can further include information associated with API calls, API imports, and/or API exports. Additionally, static data can include information associated with relationships and/or dependencies within an application. Runtime data of application's intrinsic data that can uniquely identify the application can include either runtime internal data regarding performance and resources, or runtime external data regarding dependencies between network, database, etc. In some embodiments, external context data 350 may include information of one or more of a usage and utilization history, and/or identify particular users of the particular application and/or machines on which the particular application was executed. In some embodiments, runtime app data 360 may include, for example, external runtimes indicative of network, database, remote access, and dependency metrics. Runtime app data 360 may also include internal runtimes indicative of performance of the application and computer resources used by the application. In some embodiments, static app data 370 may include, for example, relationships and dependencies, API calls/imports/exports, files/locations/registry, and/or install logic/conditions/actions. In some embodiments, static operating system (OS) data 380 may include, for example, relationships/dependencies, API calls/imports/exports, files/locations/and registry.

Referring again to FIG. 3A, applications imported in importing step 310 can comprise any kind of application including, but not limited to, desktop applications (e.g., MSI applications 302, non-MSI applications 304), or web based applications (for example, web applications 306). MSI applications 302 can include, for example, Microsoft Installer™ or Windows Installer™ based applications. That is, MSI applications 302 can be applications that use a .msi file (Microsoft Installer™ or Windows Installer™) in the process of installation. Non-MSI applications 304 can be applications that use an interface other than Microsoft Installer™ or Windows Installer™ interface for installation.

Importing step 310 can be implemented differently between importing desktop applications and web applications. For example, Windows™ desktop applications can be imported using the applications' installation packages. These installation packages can include an .msi file or any other type of installation package used in the industry. In some embodiments, such installation packages can be App-V™ (e.g., .sft or .appv) packages. Web applications can be imported into the application compatibility system by using one of the different exemplary approaches described below, or a combination of those approaches. In some embodiments, web applications can be imported by a directed web spider to crawl over the run-time HTML pages and capture them for import into the application compatibility system. It is understood that a web spider can also be called a web crawler. A web crawler (or a web spider) is an Internet robot that systematically browses the Internet, typically for the purpose of web indexing. In other embodiments, importing can be accomplished by importing the web applications's source files. Analyze 320, report 330, and remediate 340 steps will be further addressed below.

Figure 4:
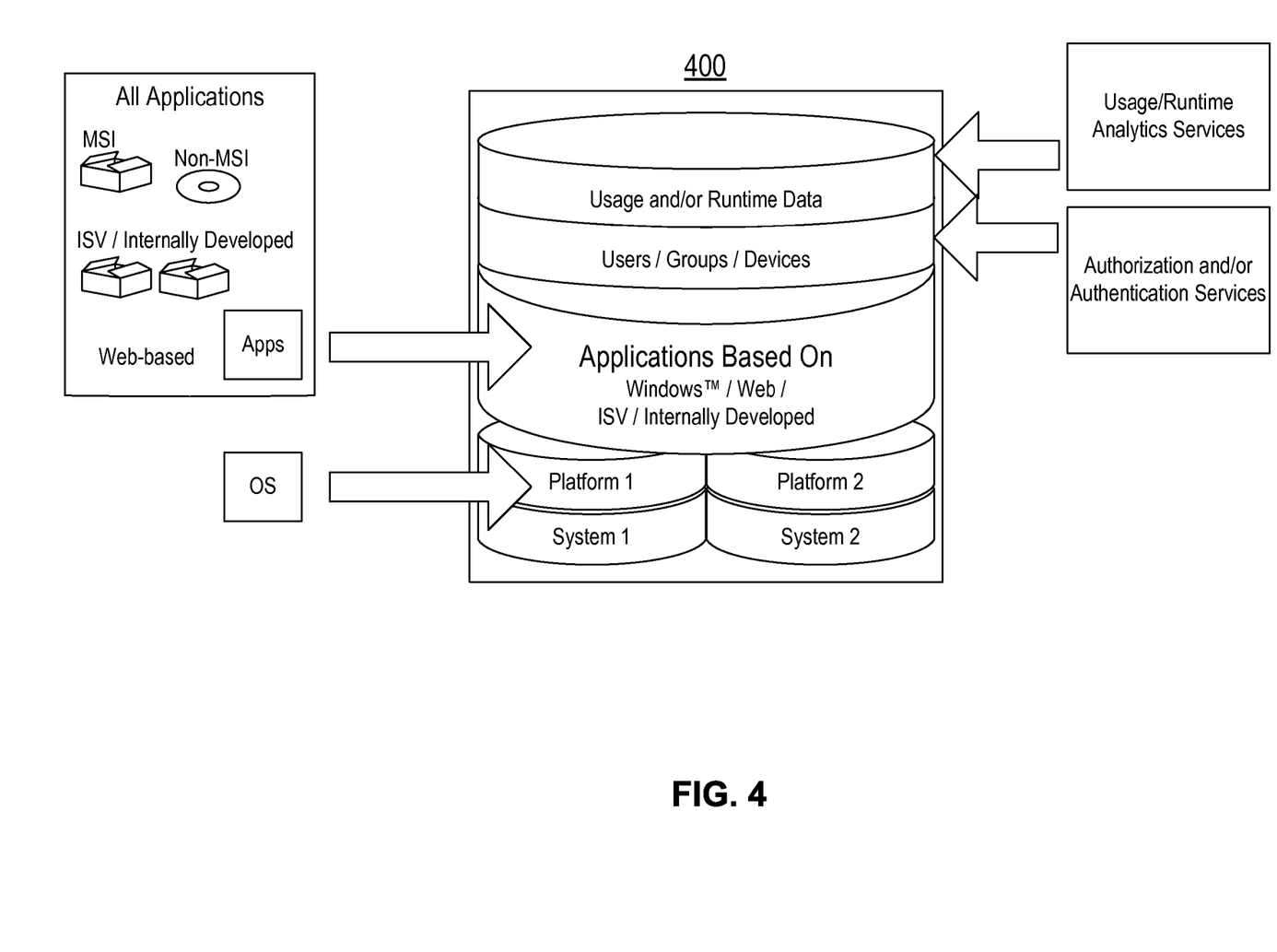
FIG. 4 is a block diagram of an exemplary database of an application compatibility system, consistent with embodiments of the present disclosure.

FIG. 4 depicts an exemplary database, database 400, of an application compatibility system. In accordance with some embodiments, database 400 can be a structured collection of tables, lists, or other data for design verification setup and runtime execution. As such, the structure may be organized as a relational database or an object-oriented database. In other embodiments, database 400 can be a hardware system comprising physical computer readable storage media and input and/or output devices configured to receive and provide access to tables, lists, or other data structures. Furthermore, configured as a hardware system, database 400 can include one or more processors and/or displays.

In some embodiments, database 400 can reside within a server (e.g., server 122) hosting the application compatibility system. In other embodiments, database 400 can reside on a server (or on a distributed network of servers) remote from a server hosting the application compatibility system. Applications imported in the importing step of the application compatibility system can reside in database 400. Each such application can be associated with one or more compatibility algorithms, which can also reside in database 400. In some embodiments, compatibility algorithms are created by a user of the application compatibility system, whereas in other embodiments, such algorithms can already be created and saved in a universal algorithm library residing in database 400.

Database 400 can also include information associated with operating systems (e.g., operating system intrinsic data) running on computing device 200. For example, operating systems running on computing device can include Windows 7™, Windows Server 2003™, Windows XP™, and Windows Server 2008 R2™. In some embodiments, information associated with operating system (e.g., operating system image or snapshot) can be uploaded by a user of the application compatibility system, whereas in other embodiments such information can be extracted by an application compatibility system itself. For example, operating system intrinsic data can include information describing a certificate chain on an operating system image. Using the signing certificate authority on the certificate chain, an algorithm can simply process the certificate chain until it identifies the certificate as either trusted or untrusted. It will be understood that the application compatibility system can also allow users to load multiple operating system images concurrently to enable the user to execute algorithms for compatibility with all such platforms in a single pass.

Figure 5:
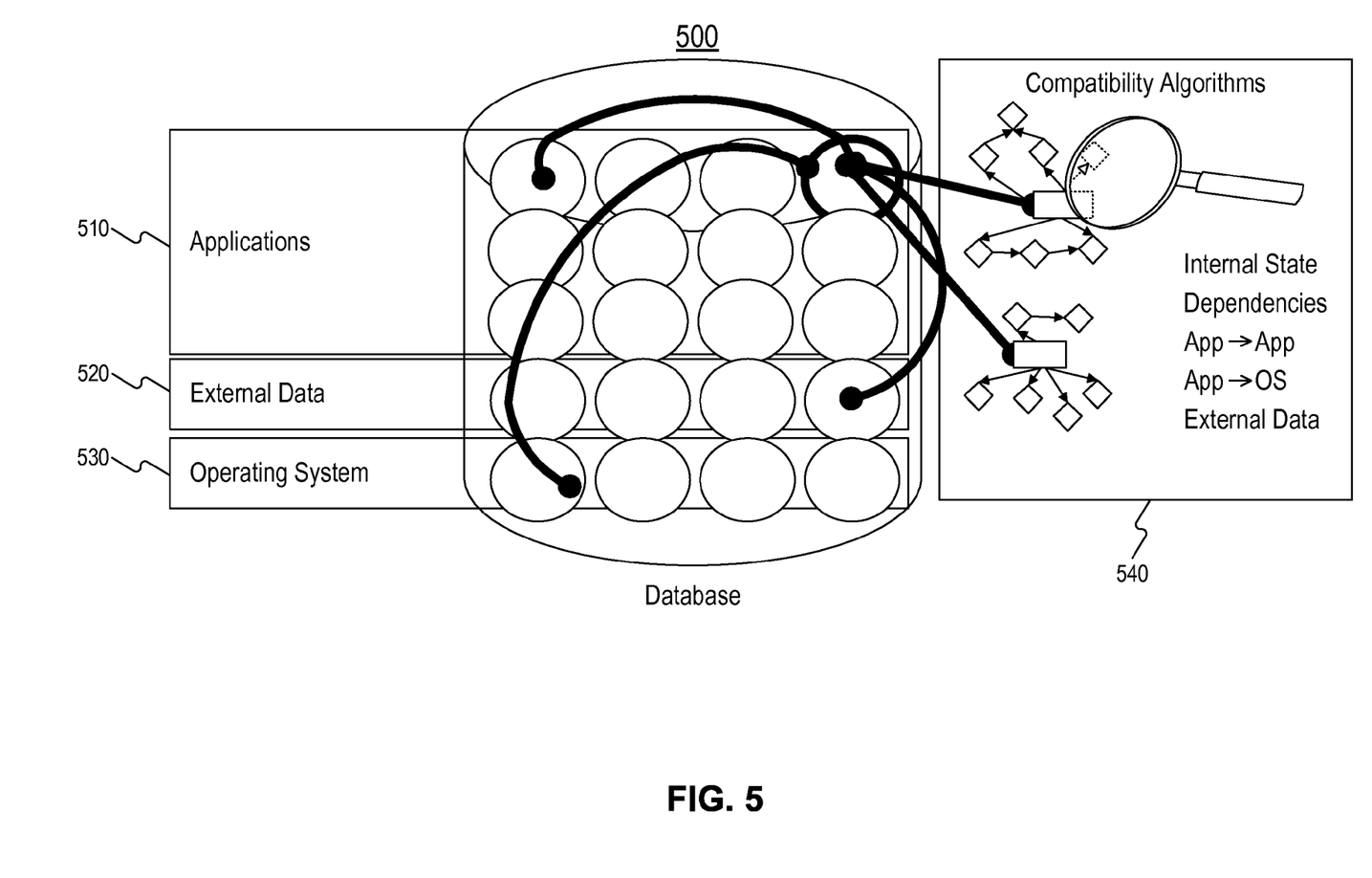
FIG. 5 is a block diagram of an exemplary analysis step of an application compatibility system, consistent with embodiments of the present disclosure.

FIG. 5 depicts a diagram of an exemplary application compatibility analysis 500, such as analysis step 320 of FIG. 3A. Inputs in analysis 500 may include, for example, applications 510, external data 520, and operating system data 530 (such as external context data 350, runtime application data 360, static application data 370, and static operating system data 380 of FIG. 3B). After importing one or more applications into a database for the application compatibility system (e.g. step 310 in FIG. 3A), those applications can be analyzed to check for compatibility with one or more platforms including operating system(s) 530, using one or more compatibility algorithms 540. An exemplary analysis process can include analyzing an application's intrinsic data that can uniquely identify the application comprising information associated with an application's install logic, files, registry settings, configuration settings, or API calls. In some embodiments, an analysis process can also include analyzing any of an operating system image data, external data, journal entries, or configuration manager data associated with runtime environment. In some embodiments, analysis 500 may involve analyzing imported applications just once. In some embodiments, however, imported applications may be re-analyzed one or more times, for example, based on changes to any attributes of the one or more platforms including an operating system of the one or more platforms. Furthermore, if there are any changes to any of the other attributes of the one or more platforms, imported applications can also be re-analyzed.

Imported applications can be associated with compatibility algorithms 540 that can be used in the analysis process. In some embodiments, each imported application can be associated with one or more compatibility algorithms. Compatibility algorithms can be implemented as heuristic algorithms. In some embodiments, compatibility algorithms can relate to information associated with the one or more platforms including internal states, dependencies, relationship between one application to another, relationship between an application and an operating system, or external data. Compatibility algorithms can also relate to operating system image-dependent algorithms, including dependencies on features that are provided by an operating system. When relevant, these algorithms can interrogate the operating system image data that has been loaded into the database (e.g., database 400) of the application compatibility system. These algorithms can check a variety of operating system image information, including: APIs, registry information, file management system for each fixed drive partition, the certificate store, or some compatibility settings.

The application compatibility system can generate reports (e.g., report step 330 in FIG. 3A) as an output of analysis 500. For example, such reports can contain information about the status of compatibility algorithms that have been analyzed by the application compatibility system to determine whether applications are compatible to a corresponding platform. In some embodiments, reports can include a plurality of icons to indicate the compatibility status of an application. Examples of the reports are provided in application Ser. No. 14/094,697, which is incorporated by reference in its entirety. For example, Red, Amber, and Green icons in the generated report may represent different statuses for an application. A green icon may indicate that an application is likely to work on a target platform, an amber icon may indicate that an application may fail or have impaired functionality, although remediation is possible. A red icon, on the other hand, may indicate that the application is likely to or certain to fail, and the application may need redevelopment.

The application compatibility system can provide information about any compatibility issues detected in one or more applications. For example, applications that may fail or have impaired functionality (and have an amber icon in their generated report) may require remediation. As referred to herein, remediation may include a process of resolving compatibility issues by making changes to applications or the environment so that those applications can work without complications on the target platform. The application compatibility system can provide remediation reports, which provide information about steps needed to fix detected compatibility issues, where possible. In some embodiments, more than one alternative remediation approach can be provided in the remediation report. The remediation report can also provide details of the application components that are affected by each compatibility issue.

Figure 6:
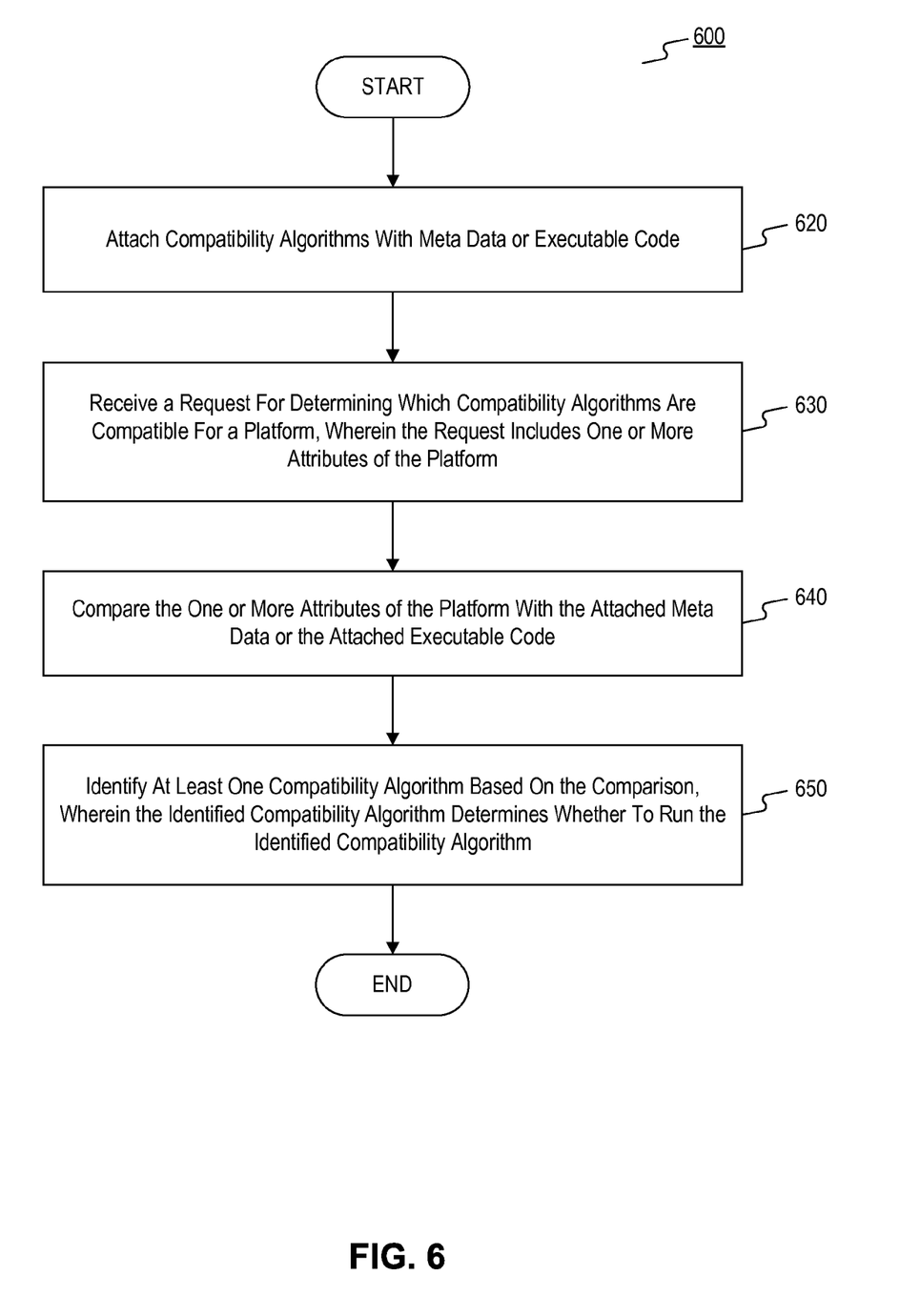
FIG. 6 is a flowchart illustrating an exemplary method for identifying compatibility algorithms to be executed for compatibility testing of applications for a platform, consistent with embodiments of the present disclosure.

FIG. 6 is a flowchart illustrating an exemplary process 600 for identifying compatibility algorithms to be executed for compatibility testing of applications for a platform, consistent with embodiments of the present disclosure. It will be appreciated that FIG. 6 is non-limiting, and that the illustrated process 600 can be altered to change the order of the steps, delete steps, or include additional steps.

After starting process 600, in step 620 an application compatibility system may attach metadata to compatibility algorithms used for determining the compatibility of applications with platforms. In some embodiments, attaching metadata can include appending metadata to compatibility algorithms, such as attaching metadata at the end of the algorithm. In some embodiments, attaching metadata can include prepending metadata to compatibility algorithms, such as attaching meta data at the beginning of the algorithm or as a header to the algorithm. In some embodiments, compatibility algorithms can be stored in a memory of a server (e.g., server 122). In some embodiments, attached metadata may include an Extensible Markup Language ("XML") file. The XML file comprising metadata can be loaded into an application migration database (e.g., database 400) and attached to each compatibility algorithm, when the application is being installed. It is appreciated that other file formats, instead of XML, can be used to attach metadata. The attached metadata can be analyzed for identifying which compatibility algorithms need to be executed in the process of compatibility testing of applications for a platform. It is appreciated that attaching metadata can also be accomplished by either attaching, mapping, or otherwise linking metadata to the algorithm in a manner that results in associating metadata to compatibility algorithms. In some embodiments, metadata and/or executable code may be previously attached to one or more compatibility algorithm, and a processor may acquire the one or more compatibility algorithms having the attached metadata and/or executable code.

In some embodiments, the attached metadata can be associated with information related to a platform of a user device (e.g., computing device 200). For example, such information can include a version information of an operating system (e.g., Windows 7™) running on the user device. Furthermore, in some embodiments, the operating system version information can include either a major version number of the underlying runtime environment ("URE") or a minor version number of the URE.

In some embodiments, attached metadata may include information associated with the architecture of one or more processors (e.g., CPU 221) of a user device (e.g., computing device 200). For example, such information can identify whether the one or more processors comprise a 32-bit architecture or a 64-bit architecture, which can be extracted by analyzing the URE. Meta data can also include information associated with a web browser (e.g., Google Chrome™, Mozilla™ Firefox™) running on computing device of the user device. For example, such information can include the types of web browsers (e.g., Google Chrome™, Mozilla™ Firefox™) or the version numbers of a web browser (e.g., Firefox™ version 24), which can be extracted by analyzing the URE. Moreover, in some embodiments, metadata can include information associated with an application's packaging format.

In some embodiments, the attached metadata may include information associated with an application virtualization presence, where the applications run on a virtualization platform (e.g., Microsoft™ Application Virtualization™ client; also known as App-V™). For example, the URE can be analyzed to identify the presence of an application virtualization software (e.g., App-V™) and additionally to extract the version information of such software. Furthermore, in other embodiments, metadata can include information associated with hosted desktop virtualization presence (e.g., Citrix™ XenDesktop™) or hosted application virtualization presence (e.g., Citrix™ XenApp™). For example, the URE can be analyzed to identify the presence of either a hosted desktop virtualization software (e.g., Citrix™ XenDesktop™) or hosted application virtualization software (e.g., Citrix™ XenApp™) and additionally to extract the version information of any such software.

In step 620, one or more of the compatibility algorithms can be attached with a piece of executable code to determine whether the compatibility algorithm is to be executed. In some embodiments, the executable code may include instructions for determining whether the attached compatibility algorithms should run, based on attributes of the platform and information associated with the compatibility algorithm. In some embodiments, attaching a piece of executable code can include appending a piece of executable code to compatibility algorithms. For example, appending a piece of executable code can include attaching the piece of executable code at the end of the algorithm. In some embodiments, attaching a piece of executable code can include prepending a piece of executable code to compatibility algorithms. For example, prepending a piece of executable code can include attaching the piece of executable code at the beginning of the algorithm or as a header to the algorithm. In some embodiments, a portion of the compatibility algorithm including a piece of executable code can be executed before executing the algorithm, to determine whether the compatibility algorithm should be executed. Based on the outcome of the execution of the portion of the compatibility algorithm including the piece of executable code, a determination can be made whether to execute the complete compatibility algorithm. This determination step may be implemented for all compatibility algorithms of the application compatibility system.

In some embodiments, a piece of executable code can be attached to compatibility algorithms instead of or, in addition to, attaching metadata, as described above. All compatibility algorithms, in some exemplary embodiments, can reside in a universal algorithm library at a server (e.g., server 122). In some embodiments, an attached piece of executable code for compatibility algorithms can include code regarding any one or more of the following: group policy object settings, an existence of a Windows™ patch, specific registry settings, existence of specified files and/or folders, existence of a specified application, whether specified features are either enabled or disabled in the operating system (e.g., user account control, session 0 control), and whether to run certain package assessment algorithms on certain package types of applications. For example, a piece of executable code may instruct an attached compatibility algorithm to execute when the algorithm is associated with Windows 7 and the platform is currently running Windows 7.

Exemplary embodiments consistent with this disclosure can include both attaching metadata and attaching one or more pieces of executable code for each compatibility algorithm. It is appreciated that some embodiments can comprise compatibility algorithms with either the attached metadata or the attached piece of executable code only.

After attaching metadata and/or piece of executable code to each compatibility algorithm, in step 630, a request can be received for determining which compatibility algorithms are compatible for a given platform. In some embodiments, request 630 can be received at a server (e.g., server 122) hosting the application compatibility system. In some embodiments, request 630 may be received in response to a user input, such as an end user or a system administrator who intends to determine the compatibility of one or more applications. Request 630 can include information associated with one or more attributes of the one or more platforms. For example, the one or more attributes can be any kind of metadata including operating system version, processor architecture, type of web browser, application's packaging format, application virtualization presence, hosted desktop virtualization presence, or hosted application virtualization presence.

In some embodiments, the one or more attributes can be information associated with attaching a piece of executable code including code regarding any one of the following: group policy object settings, an existence of a Windows™ patch, specific registry settings, existence of specified files and/or folders, existence of a specified application, whether specified features are either enabled or disabled in the operating system (e.g., user account control, session 0 control), and whether to run certain package assessment algorithms on certain package types of applications.

In step 640, a comparison can be made between the received request's one or more attributes of the platform with that of the attached metadata or with information provided in the executable code. Such a comparison can be made for each compatibility algorithm stored in the universal algorithm library. In some embodiments, step 640 can be executed by a server (e.g., server 122) hosting the application compatibility system. In other embodiments, step 640 can be executed by a computing device (e.g., computing device 102A-F). In some embodiments, executable code attached to a compatibility algorithm may perform the comparison. For example, the executable code may compare received attributes of a platform to information and attributes of the attached compatibility algorithm, to identify matching attributes and determine whether the compatibility algorithm should execute. The results of step 640 can be stored in a memory, such as memory in a computing device (e.g., computing device 200) or a server (e.g., server 122).

Based on the results of step 640, in step 650, one or more compatibility algorithms can be identified for executing in a compatibility check. Identification can be based on satisfying a condition between the one or more attributes of the received request with that of the attached metadata, such as identifying one or more compatibility algorithms with matching information or attributes as the platform attributes. For example, a condition may require that the one or more attributes of the platform include an operating system version information that is the same as or designated as being the same as the operating system information included in attached meta data (e.g., Windows 8.1™). In some embodiments, the condition can be met only if the operating system version information is identical between the attached metadata and the one or more attributes of the platform. In other embodiments, the condition might only require that the major version of the operating system version information be the same between the attached metadata and the one or more attributes of the platform.

In some embodiments, step 650 can include a determination wherein each one of the identified compatibility algorithms can self-determine whether to run the identified compatibility algorithm or not. That is, the determination can be performed by each of the identified compatibility algorithms themselves while those algorithms are being executed on the appropriate component. For example, executable code attached to a compatibility algorithm may determine, based on the comparison in step 640, whether the attached compatibility algorithm should be fully executed. In some embodiments, the determination can be conducted by one or more servers (e.g., server 122) hosting the application compatibility system. In some embodiments, the determination can be conducted by one or more computing devices (e.g., computing device 102A-F). The determination can include processing of the attached metadata including satisfying a condition. For example, a condition can include a relationship between the one or more attributes of the platform and the attached metadata.

Following step 650, process 600 may end, and a processor may execute the identified compatibility algorithms that are determined as suitable for executing (steps not shown in figures). In some embodiments, the processor may determine, based on results of the identified compatibility algorithms, whether the application is compatible with the platform operating system, hardware, and configuration. The processor may generate one or more reports indicating whether an application is compatible (such as step 330 of FIG. 3A), and if the application is not compatible, one or more reasons for incompatibility, to assist a user in remediating the incompatibility (such as step 340 in FIG. 3A).

It is appreciated that other conditions associated with other kinds of meta data including, processor architecture, web browsers, application's packaging format, application virtualization presence, hosted desktop virtualization presence, or hosted application virtualization presence, as described above, can be used in step 650. In some embodiments, step 650 can be executed by a server (e.g., server 122) hosting the application compatibility system. In other embodiments, step 650 can be executed by a computing device (e.g., computing device 102A-F) on the client side.

The methods disclosed herein may be implemented as a computer program product, i.e., a computer program tangibly embodied in an information carrier, e.g., in a non-transitory machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes may be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

What is claimed is:

1. A computer-implemented method for configuring software compatibility algorithms prior to a compatibility analysis for an application, the method being performed by one or more processors, the method comprising:
    acquiring one or more compatibility algorithms having attached metadata or executable code, the one or more compatibility algorithms being associated with an application;
    receiving a request for determining which of the one or more compatibility algorithms are compatible with a platform, wherein the request includes one or more attributes of the platform;
    comparing the one or more attributes of the platform to information in the attached meta data or executable code;
    identifying at least one compatibility algorithm based on the comparison, wherein the identified compatibility algorithm can determine whether to run the identified compatibility algorithm; and
    performing a compatibility analysis for the application and the platform using the at least one identified compatibility algorithm.

2. The method of claim 1, wherein the attached metadata is prepended or appended to the one or more compatibility algorithms.

3. The method of claim 1, wherein the metadata includes information associated with an operating system.

4. The method of claim 1, wherein the metadata includes information associated with a processor architecture.

5. The method of claim 1, wherein the metadata includes information associated with a web browser.

6. The method of claim 1, wherein the metadata includes information associated with an application's package format.

7. The method of claim 1, wherein the metadata includes information associated with an application virtualization presence.

8. The method of claim 1, wherein the metadata includes information associated with a hosted desktop virtualization presence or a hosted application virtualization presence.

9. An apparatus for configuring compatibility algorithms prior to a compatibility analysis for an application, the apparatus comprising:
one or more processors configured to:
acquire one or more compatibility algorithms having attached metadata or executable code, the one or more compatibility algorithms being associated with an application;
receive a request for determining which or the one or more compatibility algorithms are compatible with a platform, wherein the request includes one or more attributes of the platform;
compare the one or more attributes of the platform to information in the attached meta data or the attached executable code;
identify at least one compatibility algorithm based on the comparison, wherein the identified compatibility algorithm determines whether to run the identified compatibility algorithm; and
perform a compatibility analysis for the application and the platform using the at least one identified compatibility algorithm.

10. The server of claim 9, wherein the attached metadata is prepended or appended.

11. The server of claim 9, wherein the metadata includes information associated with an operating system.

12. The server of claim 9, wherein the metadata includes information associated with a processor architecture.

13. The server of claim 9, wherein the metadata includes information associated with a web browser.

14. The server of claim 9, wherein the metadata includes information associated with an application's package format.

15. The server of claim 9, wherein the metadata includes information associated with an application virtualization presence.

16. The server of claim 9, wherein the metadata includes information associated with a hosted desktop virtualization presence or a hosted application virtualization presence.

17. A non-transitory computer-readable medium storing instructions that are executable by one or more processors cause the one or more to perform a method for configuring compatibility algorithms prior to a compatibility analysis for an application, the method comprising:
acquiring one or more compatibility algorithms having attached metadata or executable code, the one or more compatibility algorithms being associated with an application;
receiving a request for determining which of the one or more compatibility algorithms are compatible with a platform, wherein the request includes one or more attributes of the platform;
comparing the one or more attributes of the platform to information in the attached metadata or executable code;
identifying at least one compatibility algorithm based on the comparison, wherein the identified compatibility algorithm determines whether to run the identified compatibility algorithm; and
performing a compatibility analysis for the application and the platform using the at least one identified compatibility algorithm.

18. The computer-readable medium of claim 17, wherein the attached metadata is prepended or appended.

19. The computer-readable medium of claim 17, wherein the metadata includes information associated with an operating system.

20. The computer-readable medium of claim 17, wherein the metadata includes information associated with a processor architecture.

21. The computer-readable medium of claim 17, wherein the metadata includes information associated with a web browser.

22. The computer-readable medium of claim 17, wherein the metadata includes information associated with an application's package format.

23. The computer-readable medium of claim 17, wherein the metadata includes information associated with an application virtualization presence.

24. The computer-readable medium of claim 17, wherein the metadata includes information associated with a hosted desktop virtualization presence or a hosted application virtualization presence.

* * * * *